United States Patent
Chandrashekar et al.

(10) Patent No.: US 10,540,279 B2
(45) Date of Patent: Jan. 21, 2020

(54) SERVER-BASED PERSISTENCE MANAGEMENT IN USER SPACE

(71) Applicant: NETAPP, INC., Sunnyvale, CA (US)

(72) Inventors: Girish Chandrashekar, Bangalore (IN); Sourav Basu, Bangalore (IN); Vasudev Jakhar, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 16/378,368

(22) Filed: Apr. 8, 2019

(65) Prior Publication Data

US 2019/0236008 A1 Aug. 1, 2019

Related U.S. Application Data

(63) Continuation of application No. 14/967,219, filed on Dec. 11, 2015, now Pat. No. 10,255,180.

(51) Int. Cl.
*G06F 12/08* (2016.01)
*G06F 16/172* (2019.01)
(Continued)

(52) U.S. Cl.
CPC .......... *G06F 12/0802* (2013.01); *G06F 3/065* (2013.01); *G06F 3/067* (2013.01); *G06F 3/0619* (2013.01); *G06F 3/0631* (2013.01); *G06F 3/0643* (2013.01); *G06F 16/172* (2019.01); *G06F 2212/604* (2013.01)

(58) Field of Classification Search
CPC .. G06F 12/0802; G06F 3/0619; G06F 3/0631; G06F 3/0643; G06F 3/065; G06F 3/067
See application file for complete search history.

(56) References Cited

U.S. PATENT DOCUMENTS 5,740,370 A ‡ 4/1998 Battersby ............... H04L 29/06 709/21
7,266,555 B1 ‡ 9/2007 Coates .................. G06F 16/172 707/82

(Continued)

FOREIGN PATENT DOCUMENTS

WO 9524685 A1 9/1995

OTHER PUBLICATIONS

Int. Search Report/Written Opinion cited in PCT Application No. PCT/US2016/066097 dated Mar. 28, 2017, 12 pgs.‡

(Continued)

*Primary Examiner* — Masud K Khan
(74) *Attorney, Agent, or Firm* — Klein, O'Neill & Singh, LLP (57) ABSTRACT

A persistence management system performs, at a server, operations associated with a number of applications. At the server, a persistence manager can intercept a file system call from one of the applications, wherein the file system call specifies a file located on a remote persistent storage device separate from the server. The persistence manager can determine that data belonging to the file requested by the file system call is stored on a local persistent storage device at the server, retrieve the data from the local persistent storage, and respond to the file system call from the application with the data.

20 Claims, 5 Drawing Sheets

(51) Int. Cl.
*G06F 3/06* (2006.01)
*G06F 12/0802* (2016.01)

(56) References Cited

U.S. PATENT DOCUMENTS

| | | | | |
|---|---|---|---|---|
| 8,700,727 | B1 ‡ | 4/2014 | Gole | H04L 67/104 709/21 |
| 8,898,388 | B1 | 11/2014 | Kimmel | |
| 2009/0204781 | A1* | 8/2009 | Burns | G06F 12/0223 711/172 |
| 2010/0198889 | A1* | 8/2010 | Byers | G06F 3/0605 707/827 |
| 2012/0159480 | A1* | 6/2012 | Matsuzawa | G06F 9/45558 718/1 |
| 2013/0166271 | A1 ‡ | 6/2013 | Danielsson | G06F 11/3664 703/22 |
| 2015/0254320 | A1* | 9/2015 | Cowling | G06F 16/275 707/613 |
| 2016/0062685 | A1 ‡ | 3/2016 | Sundararajan | G06F 3/0619 711/162 |
| 2016/0203069 | A1* | 7/2016 | Gill | G06F 11/3034 709/224 |

OTHER PUBLICATIONS

International Search Report and Written Opinion for Application No. PCT/US2016/066097 dated Mar. 28, 2017, 12 pages.
Arlitt, M., et al., "Evaluating Content Management Techniques for Web Proxy Caches," ACM Sigmetrics Performance Evaluation Review, Association for Computing Machinery, New York, NY, US, Mar. 2000, vol. 27 (4), pp. 3-11, XP058192465.
Khan, S.M., et al., "Using dead blocks as a virtual victim cache", Proceedings of the 19th International Conference on Parallel Architectures and Compilation Techniques, Pact '1 0, ACM Press, New York, New York, USA, Sep. 11, 2010, pp. 489-500, XP058312618.
Wang W.H., et al., "Organization and Performance of a Two-level Virtual-real Cache Hierarchy," ACM SIGARCH Computer Architecture News, ACM Special Interest Group on Computer Architecture, 2 Penn Plaza, Suite 701 New York NY 10121-0701 USA, Apr. 1989, vol. 17 (3), pp. 140-148, XP058374861.
Office Action on corresponding foreign application (EP Application No. 16820469.1) from the European Patent Office dated Dec. 5, 2019.

\* cited by examiner
‡ imported from a related application

SERVER-BASED PERSISTENCE MANAGEMENT IN USER SPACE

CROSS-REFERENCE TO RELATED APPLICATION

This patent application claims priority of and is a continuation of U.S. patent application Ser. No. 14/967,219, filed on Dec. 11, 2015, the disclosure of which is incorporated herein by reference in its entirety.

TECHNICAL FIELD

Examples described herein relate to storage management, and more specifically, to a system and method for server-based persistence management in user space.

BACKGROUND

In computing, a file server is a device attached to a network that has the primary purpose of providing a location for shared disk access, i.e., shared storage of computer files (such as documents, sound files, photographs, movies, images, databases, etc.) that can be accessed by other machines or virtual machines connected to the network. One common type of file server is a network-attached storage (NAS) device. NAS is specialized for serving files either by its hardware, software, or configuration, and is often manufactured as a computer appliance—a purpose-built specialized computer. NAS systems are networked appliances which contain one or more storage drives, often arranged into logical, redundant storage containers or RAID.

File servers, including NAS devices, can also be utilized to form a storage area network (SAN), which provides access to consolidated, block level data storage. SANs are primarily used to enhance storage devices, such as disk arrays and tape libraries, so that the devices appear to the operating system as locally attached devices. A SAN typically has its own network of storage devices that are generally not individually exposed outside of the SAN. The cost and complexity of SANs have dropped over time, allowing wider adoption across both enterprise and small to medium-sized business environments. At the same time, the number of file storage products and servers, including NAS devices, has greatly increased.

File servers often provide caching solutions that reduce the amount of time necessary to respond to data requests from other servers. However, taking advantage of these caches still requires transmitting requests for data to the file servers, which may be at a remote, off-site location accessible through a network. Depending on distance and network congestion, a server may have to wait an unacceptably long time to retrieve data even if it is cached at the file server.

DETAILED DESCRIPTION

Technology trends such as the availability of optimized flash devices with high Input/output Operations per Second (IOPS) and the delegation of file storage to specialized data storage appliances have made server-based persistent caching a more attractive option for host servers that utilize remote data storage. These appliances, including Network Attached Storage (NAS) and Storage Area Networks (SAN), can provide specialized features, faster data access, easier administration, and a simple configuration for enterprise environments. In addition, a NAS can efficiently utilize storage capacity, serve files to many different server environments, and provide disaster recovery, failover, and deduplication. However, while fast storage technologies like flash drives have improved, the speed of transferring data to a storage appliance over a network has not, and in many cases has become worse due to the storage appliances being hosted at remote, off-site locations. As a result, persistent caching solutions managed at the server-side, closer to the applications themselves, can now provide advantages over caching at the storage appliances themselves.

Under conventional approaches, local caching is done in various ways at the block layer in a guest operating system of virtual machines (VMs), in a hypervisor, or in a separate VM. For non-virtualized environments, caching is typically done inside the kernel of the operating system at the root or administrative level. Due to open source licensing issues and issues of ownership of the server's operating system kernel, alternative ways to provide persistence management are needed.

Examples as described provide server-side persistence management for data storage appliances such as NAS devices. A persistence manager can be interposed, in user space, between applications running on a server and the file system APIs that the applications use to interact with files on remote data storage appliances. Once interposed, the persistence manager can intercept API calls from the applications in order to cache and serve frequently-accessed data from a high-speed persistent cache on the server.

Among other advantages, applications running on the server can remain unchanged because the interposer intercepts standard file system calls that the applications are already programmed to use. This allows the persistence manager to function with any application that takes advantage of standard file system APIs. In addition, a single interposer for a standard API, such as POSIX, can be used for all POSIX-compliant applications. Furthermore, the persistence manager can provide caching for born-in-cloud applications designed for server-side managed storage.

Examples as described bring application awareness to the persistence management layer. For example, a cache manager can know the difference between a redo log file and database file, which can allow a user to make logical decisions such as whether to replicate the database file, cache the log file in memory, etc. Unlike conventional caching solutions, examples as described separate cache block allocation for data from cache management, which allows persistence management regardless of file system layout and type of media. In some aspects, block level caching can also be implemented with every logical unit number (LUN) being mapped as a file in the file level cache.

In addition, the persistence manager can maintain application-consistent snapshots via epoch management and periodically flush these snapshots to the data storage appliances. Among other benefits, maintaining local, cached snapshots can increase efficiency by reducing the amount of write-back done to the data storage appliances.

According to one aspect, a persistence management system performs, at a server, operations associated with a number of applications. At the server, a persistence manager can intercept a file system call from one of the applications, wherein the file system call specifies a file located on a remote persistent storage device separate from the server. The persistence manager can determine that data belonging to the file requested by the file system call is stored on a local persistent storage device at the server, retrieve the data from the local persistent storage, and respond to the file system call from the application with the data.

In further aspects, the persistence manager retrieves further data belonging to the file from the remote persistent storage device when the further data is not found on the local persistent storage device. The persistence manager can then respond to the file system call from the application with the data and the further data and write the further data to the local persistent storage device in a separate process.

In one aspect, the persistence management system writes the further data to a peer server in a high-availability configuration with the server. Furthermore, the further data can be written to the local persistent storage device independently of a file system associated with the file system call.

In various aspects, the persistence manager can determine that the file system call specifies a write operation, write new data corresponding to the write operation to the local persistent storage device, associate the new data with a snapshot of data, and write the snapshot of data to the remote persistent storage device.

Additionally, the persistence manager can intercept the file system call in user space at the server. Intercepting the file system call can be performed by a first process, determining that the data is stored on a local persistent storage device can be performed by a second process, and the first and second processes can communicate via an inter-process communication mechanism. In some examples, the file system call from the application uses the POSIX API.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Overview

Figure 1:
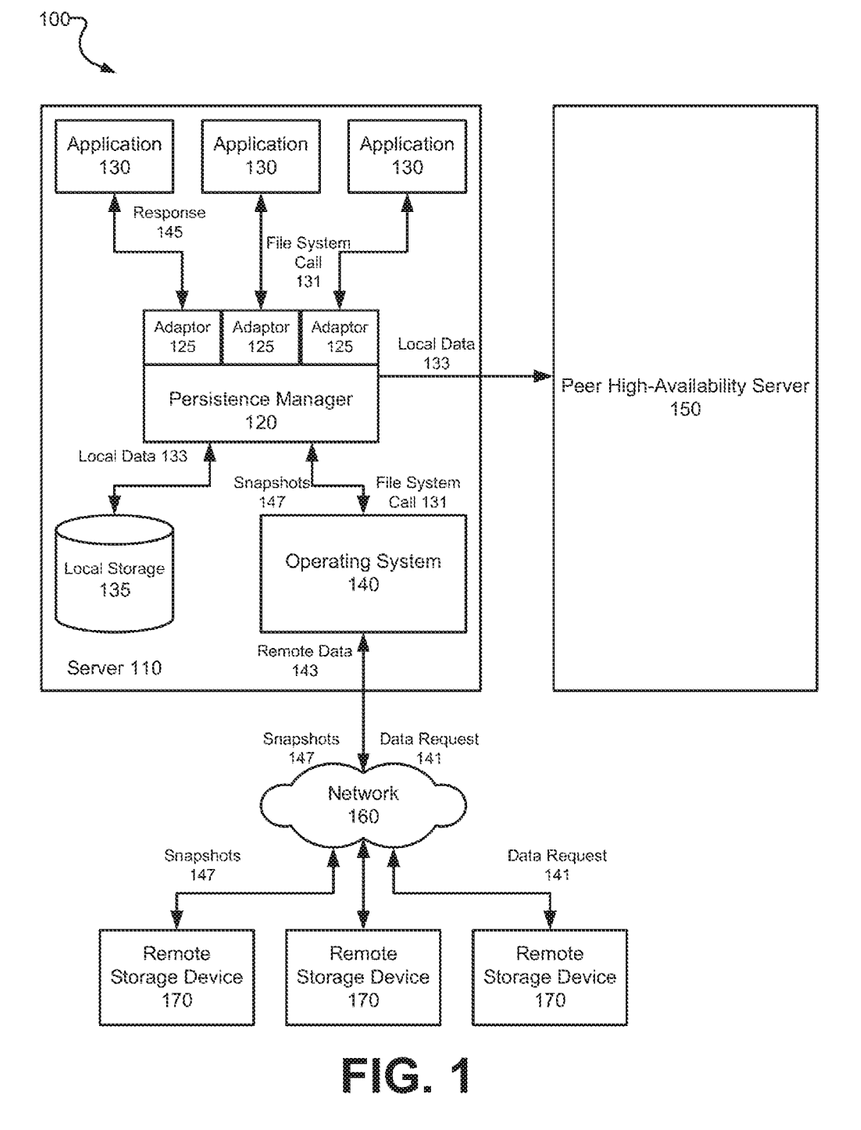
FIG. 1 illustrates an example system for server-based persistence management in user space, in accordance with some aspects.

FIG. 1 illustrates an example system for server-based persistence management in user space, in accordance with some aspects. A persistence management system 100 includes a server 110, peer high-availability server 150, and remote storage devices 170 connected across a network 160. In some aspects, the server 110 can execute one or more applications 130 and include a persistence manager 120 with an adaptor 125 for each application 130, local storage 135, and an operating system 140.

In some examples, the persistence manager 120 layers itself below applications 130 as a POSIX interposer and interacts with the operating system 140 through POSIX APIs, thereby providing a user space control point for I/O introspection at the server 110. This enables new application-level data management, such as persistence using write-back caching, and leverages remote storage devices 170 in the backend for more traditional data management. For example, persistence manager 120 can intercept file system calls 131 from applications 130 that request data on remote storage devices 170 and more quickly provide the requested data from a cache in local storage 135. Persistence manager 120 can therefore shield remote storage devices 170 from the needs of emerging application workloads by interfacing with the applications 130 using pre-existing POSIX APIs. Although an example persistence management system is described herein in terms of POSIX, persistence manager 120 can intercept file system calls 131 and interact with the operating system 140 using adaptors 125 designed for other file system APIs.

In some aspects, persistence manager 120 includes adaptors 125 that interface with each of the applications 130. Each adaptor 125 can be a POSIX interposer which intercepts and overloads POSIX calls through LD_PRELOAD. These adaptors 125 can be exposed to the core persistence manager 120 as a shared library. In some examples, persistence manager 120 intercepts only file system-related POSIX APIs through the interposer. After file system calls 131 are intercepted, the persistence manager 120 performs caching functionalities, and if necessary, hands the file system call 131 over to the true POSIX layer above the operating system 140. This allows persistence manager 120 to avoid dependencies with lower layers of a file system or the operating system 140. Thus, the interposer enables persistence manager 120 capabilities in user space and interacts with the operating system 140 through library calls like any other user space application 130.

The core persistence manager 120 implements functionalities such as persistence management at server 110 using local storage 135 (e.g., a solid state or flash drive), replication to peer high-availability server 150, and sending snapshots 147 of persisted data to remote storage devices 170. In addition, persistence manager 120 can include a media management component to interface with different types of local storage 135.

Caching is used to accelerate application 130 I/O performance and can be achieved in persistence management system by managing access to data on local storage 135, thereby eliminating the need to access a remote file system (e.g., on remote storage devices 170). Persistence manager 120 provides predictable performance with a persistent read and write cache stored on a high-performance drive, such as a flash memory device. In some aspects, persistence manager 120 implements file level caching of remote storage devices 170 on the server 110 such that management of cached file data is leveraged from the native local file system of the operating system 140. It specifically leverages allocation, de-allocation, and access control of cached data from the file system. In addition, caching is independent of the type of file system and media on which the file system is created. This architecture makes user space the control point in providing caching functionality with application-managed flash storage. Persistence manager 120 cache management functionality can either run as part of the same process as each adaptor 125 or as a separate process with shared memory using inter process communication (IPC) between threads/processes and a cache manager. In the separate process example, a single cache manager can interact with multiple applications 130 and adaptors 125 through IPC. Cache manager can process caching requests using one of a number of techniques including round robin and priority order bases.

When one of the adaptors 125 intercepts a read I/O operation from an application 130, persistence manager 120 can determine whether data requested in the operation is cached on local storage 135, and if so, return local data 133 in a response 145 to the application 130. This can be performed without having to hand the file system call 131 over to the true POSIX layer above the operating system 140 or having to send a data request 141 over the network 160 to remote storage devices 170. In some aspects, only part of the data requested is cached on local storage 135. Persistence manager 120 can hand the file system call 131 over to the true POSIX layer above the operating system 140 in order to make a data request 141 and retrieve remote data 143. Persistence manager 120 can then combine the local data 133 and remote data 143 in order to send the response 145 back to the requesting application 130. In addition, the remote data 143 can be cached on local storage 135 for future use.

Persistence manager 120 can implement write-back caching as a mechanism to separate application data management in the server 110 from storage data management in the remote storage devices 170. However, in some instances, the write-back cache in server 110 could be the only copy of the data, which leaves the data vulnerable to server failure, hardware failure, or other faults. Hence, examples provide high availability (HA) for cached data in a server 110 through replication to a peer high-availability server 150, which can be connected to server 110 using a low-latency interconnect. Data replication to the HA peer can be managed by sub-components of the persistence manager 120. In some examples, peer high-availability server 150 comprises similar components to the server 110 and maintains a connection to the remote storage devices 170 over the network 160. In the event that the server 110 or other components such as the local storage 135 experience a failure, peer high-availability server 150 can take over. Applications 130 that were running on server 110 can be restarted on peer high-availability server 150, and clients using those applications 130 can be redirected.

Data written to local storage 135 in the server 110 is periodically flushed over network 160 to remote storage devices 170. This flushing can be performed at regular intervals called epochs through an application-consistent snapshot mechanism. Network 160 can be a local area network 160 with snapshots 147 flushed using Ethernet, or in other examples, network 160 can be a larger network (e.g., the Internet) with snapshots 147 flushed over protocols like TCP/IP. Although only one pair of servers is illustrated in FIG. 1 for simplicity, the remote storage devices 170 can serve files for any number of server pairs.

Figure 2:
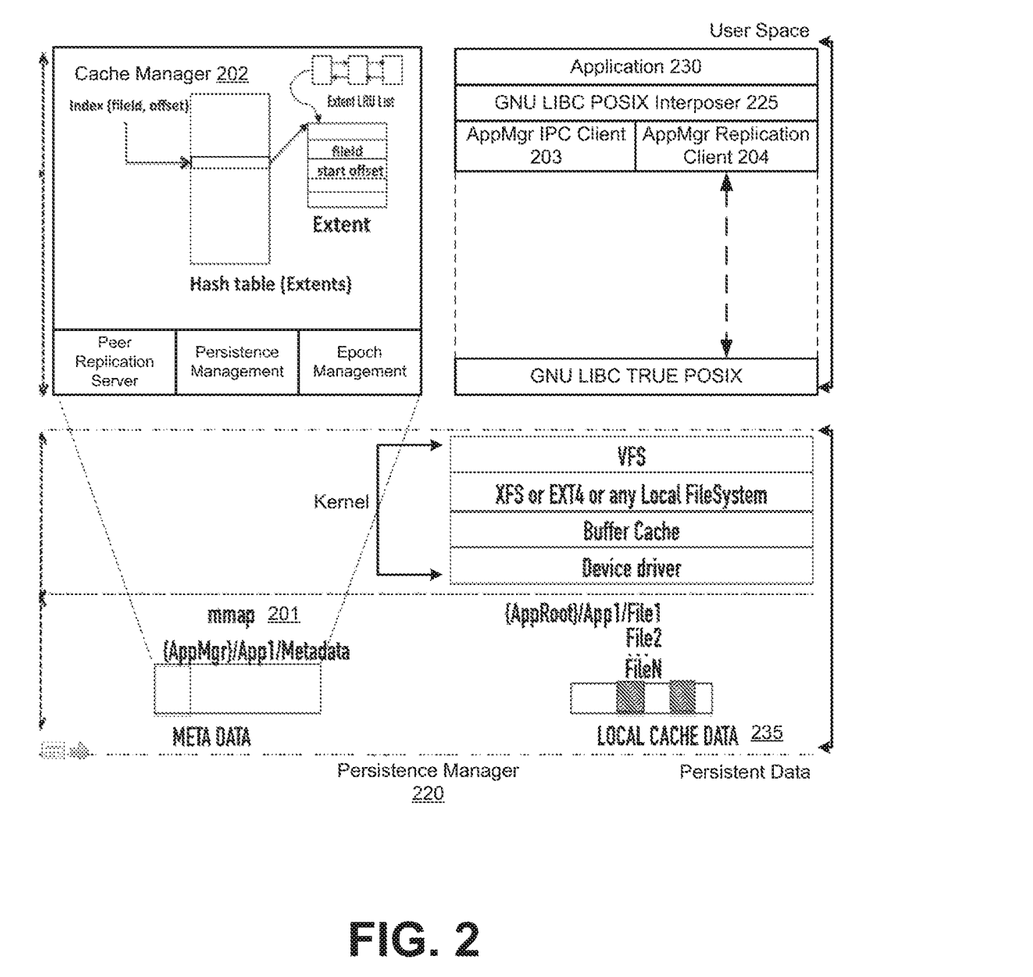
FIG. 2 illustrates an example persistence manager, in accordance with some aspects.

FIG. 2 illustrates an example persistence manager 220, in accordance with some aspects. Persistence manager 220 can be divided into two layers: a persistence layer and an in-memory layer. The persistence layer stores a memory mapped file 201 of metadata and local cache data 235, and the in-memory layer contains both kernel and user space components. In some examples, user space components include a cache manager 202 that can communicate, via AppMgr inter process communication (IPC) client 203, with an AppMgr replication client 204. With reference to FIG. 1, application 230 can represent one of the applications 130, and the GNU LIBC POSIX interposer 225 can correspond to one of the adaptors 125, which can be compiled as a shared library used with an LD_PRELOAD flag during runtime.

In some aspects, the layout of cache manager 202 includes a header, hash table of metadata entries for faster lookup, metadata entries stored as an array, free queues, and least recently used (LRU) queues. Changes in metadata entries are periodically synced to the memory-mapped (mmap) file 201 in the persistence layer. For example, they may be synced once per second. The header contains information necessary to bring up cache manager 202 across node reboots, and cached data (in the form of extents) is tracked by metadata known as a Flash Cache Extent (FCE), which is the core data structure maintained in cache manager 202.

In some examples, cache manager 202 data structures are made persistent across reboots. Data structures are allocated and managed via memory-mapped file 201, and pointer references in data structures are made relative to an offset from a start address of each data structure. These data structures are persisted on the local file system as a memory mapped file. After restart, for each pointer reference in the file, relative addresses can be converted from the new start address to absolute addresses. For soft reboots, cache manager 202 can ensure that all dirty data related to metadata is synced to memory-mapped file 201.

An extent represents the smallest unit of cached data tracked by cache manager 202. The size of an extent can vary depending on configuration of the cache manager 202. For example, the size can be initialized to 256 KB, 1 MB, or another value when the cache manager 202 is started. If the I/O size of typical workloads is small, then smaller extent sizes can result in superior performance. Similarly, if the I/O size of workloads is large, then a 1 MB extent size can be used to keep metadata overheads low, which can result in better performance for cache manager 202. If a smaller extent size (e.g., 256 KB) is used for large I/O workloads, this can result in a large metadata overhead for tracking the cached data. If a larger extent size (e.g., 1 MB) is used for smaller I/O, then an excessive amount of cache space may be left empty and wasted. In some aspects, once an extent size is set, it is not possible to change it dynamically until all dirty data is flushed to remote storage devices and cache manager 202 is re-initialized.

In further examples, the size of each FCE is 102 bytes, which allows 512 MB of memory overhead of FCEs to support 5 TB of cache data. In addition, each extent can be divided into 256 sub-blocks stored as bits in extent metadata. A 1 MB extent can be managed as 256 4 KB sub-blocks, and a 256 KB extent as 256 1 KB sub-blocks. In addition, 256 bits stored in FCE represent whether a given sub-block is present in the cache or not. Similarly, a 256-bit dirty bitmap can be stored to represent whether a given sub-block is dirty, which indicates that the data is not flushed to the remote file system. In other words, a dirty bit set for a sub-block means that the sub-block's data in the cache is newer than the data on the remote storage devices and therefore should be written to the remote storage devices. In some examples, a snapshot mechanism is used to periodically write the dirty data.

Some aspects provide for two types of locks: SHARED and EXCLUSIVE locks. SHARED locks are used for simultaneous read requests, and EXCLUSIVE locks are used for write requests and cache miss requests in the read path. An atomic lock counter is added to FCEs to keep track of locks taken. FCEs also have a wait queue which queues subsequent I/O requests that require an EXCLUSIVE lock in order to access the extent. These locks and queues can be used to protect data integrity, for example, to prevent multiple applications from simultaneously overwriting the same data or reading data as it is being written by another application.

FCEs can have a linked list node element for a hash table and can be maintained in Least Recently Used (LRU) queues, of which there can be two types, a free queue and a usable queue. At the time of initialization, FCEs are allocated and are pushed into the free queue. FCEs can also be divided into two types: those with data blocks and those without data blocks. The number of FCEs with data blocks is based on the capacity of available local storage divided by the extent size.

FCEs without data blocks are used to represent extents that are evicted from cache. Both the types of FCEs are added to free queue during initialization and are used during I/O. In addition, a hash table can be implemented for faster searching of FCEs. During I/O, if an FCE is not found in the hash table, a corresponding FCE is allocated from the free queue and moved into the hash table. As a result, a given FCE will either be in the free queue or the hash table in addition to being in the usable LRU queue.

An epoch management component can be included in the cache manager 202 to manage snapshots of data that should be flushed to remote storage devices via a storage efficiency mechanism. This feature enables application-consistent snapshots provided that application 230 quiescence capabilities are present. When the storage efficiency mechanism requests an epoch (i.e., the current epoch), subsequent write requests can be diverted to another directory on the local file system (i.e., the next epoch) where data is written until the epoch point is frozen and marked for storage efficiency processing. Once the storage efficiency mechanism indicates that data has been flushed to remote storage devices, FCEs are marked clean by resetting dirty bits to clean for data in that epoch.

According to some examples, the local file system prepends a predefined prefix string to the cached files of the remote file system. By creating two predefined prefix folders in the local file system, one for the current epoch and one for the previous epoch, snapshots can be managed without additional metadata overhead used for epoch management. In addition, FCEs, which represent extents of cached local data files, store the current epoch value, and hash table searches can include the current epoch in addition to the filename and offset. The cache manager 202 can look up FCEs in the local file system for both epochs.

In contrast to file system operations such as reads and writes, file system metadata operations requested by applications 230 are not routed to cache manager 202. Instead, metadata operations are performed on both local and remote file systems.

In some aspects, cached data is protected against node failure/media failure through replication to a peer server, which provides high-availability for an application's data. A replication client 204 (e.g., AppMgr Replication Client) can replicate cached data to the peer node for every write I/O before sending an acknowledgement back to the application 230. In the event of server failure or other faults, the peer server can re-launch the application 230 and use the replicated data. During normal, uninterrupted server operation, the applications 230 and data on peer server can remain in a passive mode.

Management of cached file data on the local file system can be leveraged from the existing operating system and file system, which simplifies the caching implementation and allows it to be entirely managed in user space. Furthermore, the interposer 225 and clients 203, 204 do not modify applications 230 and are kept as stateless as possible. Replication client 204 consults cache manager 202 to determine whether file data requested by an application 230 is cached in the local file system (i.e., local cache data 235) or not. If the file data is not cached, replication client 204 passes the file data request to the operating system API (e.g., GNU LIBC TRUE POSIX), which can request the data from the remote file system. Once the data is received, the local cache can be populated on the local file system as a background operation. In some examples, the cache populate request is queued for asynchronous operation, which is picked up by a write scheduler thread that is part of cache manager 202.

In some aspects, cache manager 202 is started independently, and each POSIX interposer 225 is started when an application 230 is launched. The remote file system mount paths and local file system mount paths can follow a naming convention to make metadata operations (e.g., mkdir, rmdir, etc.) on directories of the cached file system simpler and faster. This naming convention can also improve lookup speeds for cached data files by eliminating the need to search for correct cached filenames. For example, if a remote storage device mount point is /os/app/file, cached data can be stored on the local file system at /cache_prefix_path/os/app/file. During an open POSIX call for the remote file system on remote storage devices, POSIX interposer 225 can simply open the file on the local cached file system with cache_prefix_path prepended to the remote path specified by the application. In addition, the local file descriptor, remote file descriptor, and remote file name checksum can be maintained in a table. As application 230 passes a file descriptor in read/write I/O operations during an open POSIX call, the checksum of the filename and the start offset, obtained from the offset aligned to the extent size, can be used as a hash table search.

Since caching is done transparently to the application, the application 230 maintains access to remote file system file descriptors. However, in order to avoid mounting the remote file system with a different name after reboot, a checksum can be calculated and stored for the remote file system paths used by the application. This can be done before a reboot to avoid losing preexisting data in the event that the mount point changes.

In modern operating systems, independent processes run in their separate address spaces, which usually do not allow processes to communicate directly with each other. However, it can be advantageous to separate functionally different pieces into independent processes and let them communicate via an Inter Process Communication (IPC) mechanism. Thus, some aspects separate the cache manager 202 (the server) component of persistence manager 220 from the POSIX interposer 225 and replication client 204 (the client) so that they can run independently from the application. This leads to several advantages over a single process model. For example, if application 230 fails (due to an error, bug, hack, etc.), the cache manager 202 component is not influenced and can continue to serve other applications 230. A multi-process model can also support multiprocessor applications 230, and each of the modules can be developed and debugged independently.

Methodology

Figure 3:
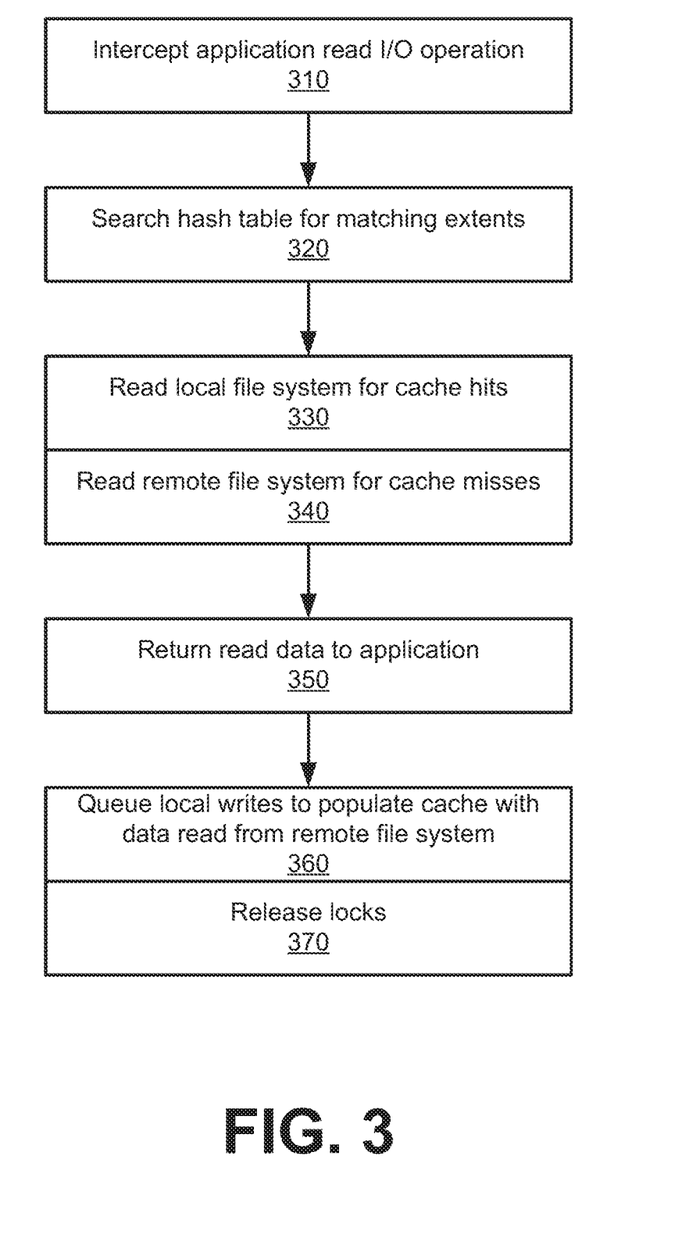
FIG. 3 illustrates an example method for reading data using a server-based persistence management in user space.
Figure 4:
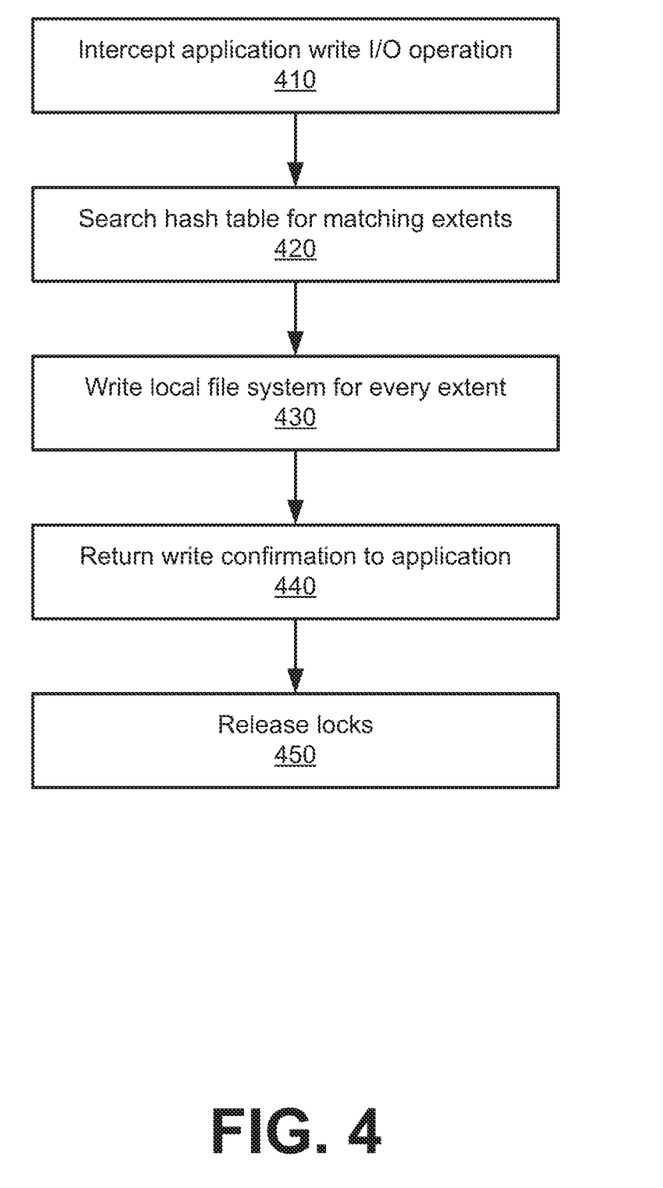
FIG. 4 illustrates an example method for writing data using a server-based persistence management in user space.

FIG. 3 illustrates an example method for reading and writing data using a server-based persistence management in user space. FIG. 4 illustrates an example method for writing data using a server-based persistence management in user space. While operations of examples of FIGS. 3 and 4 are described below as being performed by specific components, modules or systems of the persistence management system 100 or persistence manager 220, it will be appreciated that these operations need not necessarily be performed by the specific components identified, and could be performed by a variety of components and modules, potentially distributed over a number of machines. Accordingly, references may be made to elements of persistence management system 100 for the purpose of illustrating suitable components or elements for performing a step or sub step being described. Alternatively, at least certain ones of the variety of components and modules described in system 100 can be arranged within a single hardware, software, or firmware component. It will also be appreciated that some of the steps of this method may be performed in parallel or in a different order than illustrated.

With reference to an example of FIG. 3, an application read I/O operation is intercepted through for example, a persistence management system 100 as described with FIG. 1 (310). In some aspects, the read operation takes the form of a POSIX API call made by an application, and this API call is intercepted at a POSIX interposer such as adaptor 125, which is part of persistence manager 120. Next, the read I/O (fd, buffer, count) is routed to a cache manager process via IPC. The cache manager determines the number of extents based on count (I/O size) and searches a hash table for each extent. Single application I/O can be split into single or multiple consecutive read extent I/Os based on extent size compared to application I/O size.

For every extent-sized I/O, a cache hit is determined by a lookup into the hash table using the checksum (or CRC) of the file name and offset to find a file cache extent (FCE) (320). If the FCE is already present in the hash table, then a cache hit for the extent is further determined at a sub-block level (e.g., 4 KB or less) by checking the valid bits of the FCE. If all sub-blocks are valid, then the extent is declared as a cache hit. A SHARED lock type on FCE is requested, and the application is allowed to read local file system data from the local storage cache. If some of the sub-blocks are not valid, then an EXCLUSIVE lock type on the FCE is requested. If either lock is not available, then the I/O request can be moved to a wait queue for the FCE, which is woken up when the FCE is unlocked by the previous request which locked the FCE.

A cache miss occurs when the extent is not available in the hash table, which results in an FCE being allocated from the free queue. If the free queue is exhausted, then the oldest FCE in the active least recently used (LRU) queue is removed from the free queue, removed from the hash table, and its data is copied to a ghost FCE taken from a ghost LRU queue of FCEs. This freed FCE is used as a new FCE and initialized with fields such as offset, CRC of filename of current I/O, and lock count along with an EXCLUSIVE lock. This new FCE is then added to the hash table.

In some aspects, cache manager provides an eviction management mechanism to support exposing a larger cache capacity to applications than actual physical capacity of storage available to the server. This extra capacity comes in the form of ghost FCEs that do not have corresponding space in storage. A list of ghost FCEs is maintained as a ghost LRU queue. During cache manager initialization, a number of FCEs required to support the maximum cache size can be fully allocated. In some examples, reaching the maximum cache size implies that all FCEs have an extent with cached data on the local storage. Based on usable cache capacity of local storage, the FCEs are categorized as local FCEs, peer FCEs, and ghost FCEs. When an application working set exceeds caching media capacity, LRU queues are used to evict some of the FCEs as ghost FCEs and corresponding data blocks can be released. In some examples, the XFS file system is used as the local file system on a flash media storage because it supports punching holes, which releases the cached data resources on the local file system to be used for new data. In addition, only a read cache is evicted to support larger capacity on remote storage devices.

For extent-aligned I/Os, once all FCEs are locked, the cache manager sends, to a client process of the persistence manager, an array of Boolean values and sub-block bits whose size depends on number of extents for a given application I/O request size. Each value with sub-block bit indicates either cache hit or miss at the sub-block level. Based on this Boolean vector and sub-block bits returned from cache manager, persistence manager client either reads from the local file system (330) or from the remote file system (340). In some examples, the file data request is passed to the operating system API (e.g., a POSIX layer), which can request the data from the remote file system.

For extent-unaligned I/Os, either the first or last extent sub-block is read completely based on the file offset and length of I/O requested by the application. For sub-blocks that are unaligned at the beginning, the entire sub-block is read from local or remote file system and data from the beginning of the I/O to the sub-block end is copied to a buffer. For sub-blocks that are unaligned at the end, the entire sub-block is read from local or remote file system and data from the beginning of sub-block to the end of I/O is copied to the buffer.

In some aspects, the extent I/Os operate on corresponding regions of the buffer passed from the application. The first extent can cover a part of the buffer up to the extent size from the starting address of the buffer. Subsequent extents cover corresponding parts of the buffer, and data copied to the buffer is limited by the start offset and the count parameter for partial extents. During read operations, FCE is locked and removed from LRU queue. For cache misses, an FCE is allocated and added to the hash table with an EXCLUSIVE lock. Once a read of all extents are completed, either remote or local, combined data from both file systems are returned to the requesting application (350).

For every extent that was a cache miss, a write request can be queued to populate the cache on the local file system as a background activity (360). Once this local write is complete, the corresponding extent can be updated with a valid bit. If any new read/write I/Os on the same extent occur during this operation, they are queued in the EXCLUSIVE lock wait queue until the write is complete, which releases the lock (370). Once EXCLUSIVE locks are released, application thread/process requests waiting for an unlock are woken up, and one of the threads/processes takes the SHARED or EXCLUSIVE lock depending on read or write requests to the cache manager.

For partial valid sub-blocks in FCE, data from both the file systems (remote and local) are read at the sub-block level. Data with its valid bit set is chosen to be added to a combined buffer, which can then be copied to the buffer at the extent level. At the end of the read I/O operation, the FCE is added to the LRU queue.

With reference to an example of FIG. 4, an application write I/O operation is intercepted through for example, a persistence management system 100 as described with FIG. 1 (410). Similar to the read path, the write operation can take the form of a POSIX API call made by an application, and this API call is intercepted at a POSIX interposer such as adaptor 125, which is part of persistence manager 120. Next, the read I/O (fd, buffer, count) is routed to a cache manager process via IPC. Cache manager determines the number of extents based on count (I/O size) and searches a hash table for each extent. Single application I/O can be split into single or multiple consecutive read extent I/Os based on extent size compared to application I/O size.

For every extent-sized I/O, a cache hit is determined by a lookup into the hash table using the checksum (or CRC) of the file name and offset to find a file cache extent (FCE) (420). If the FCE is already present in the hash table, it is treated as a cache hit irrespective of whether the sub-blocks are valid or not. An EXCLUSIVE lock type on FCE is requested, and similar to the read path, if the lock is not available then the I/O request is moved to a wait queue of FCE, which is woken up when the FCE is unlocked by the previous request which locked the FCE.

A cache miss occurs when the extent is not available in the hash table, which results in the FCE being allocated from the free queue with data blocks. If the free queue is exhausted, then the oldest FCE in active least recently used (LRU) queue is removed from the free queue, removed from the hash table, and its data is copied to a ghost FCE taken from a ghost LRU queue of FCEs. This freed FCE is used as a new FCE and initialized with fields such as offset, CRC of filename of current I/O, and lock count along with an EXCLUSIVE lock. This new FCE is then added to the hash table.

For extent-aligned I/Os, once all FCEs are locked, the cache manager sends an array of Boolean values and sub-block bits whose size depends on number of extents for a given application I/O request size. Each value with sub-block bit indicates either a cache hit or miss at the sub-block level. For both hits and misses, the persistence manager client writes from the buffer to the local file system and updates the dirty bitmap for FCE (430).

For extent-unaligned I/Os, either the first or last extent sub-block is read completely based on the file offset and length of I/O requested by the application. For sub-blocks that are unaligned at the beginning, the entire sub-block is read from local or remote file system and data from the beginning of the I/O to the sub-block end is copied to a buffer. For sub-blocks that are unaligned at the end, the entire sub-block is read from local or remote file system and data from the beginning of sub-block to the end of I/O is copied to the buffer. The buffer can then be written to the local file system.

In some aspects, the extent I/Os operate on corresponding regions of the buffer passed from the application. The first extent can cover a part of the buffer up to the extent size from the starting address of the buffer. Subsequent extents cover corresponding parts of the buffer, and data copied to the buffer is limited by the start offset and the count parameter for partial extents. During write operations, FCE is locked and removed from LRU queue. For cache misses, FCE is allocated and added to the hash table with an EXCLUSIVE lock. Once writing of all extents to the local file system is completed, a write confirmation is returned to the requesting application and the extent is updated with a dirty bit (440). If any new read/write I/Os on the same extent occur during this operation, they are queued in the EXCLUSIVE lock wait queue until the write is complete, which releases the lock (450). Once EXCLUSIVE locks are released, application thread/process requests waiting for an unlock are woken up, and one of the threads/processes takes the SHARED or EXCLUSIVE lock depending on read or write requests to the cache manager.

For partial valid sub-blocks in the FCE, since the data from the application is new, it is written to every sub-block of the extent and corresponding dirty bits are set in the FCE. At the end of the write I/O operation, the FCE is added to the LRU queue.

Computer System

Figure 5:
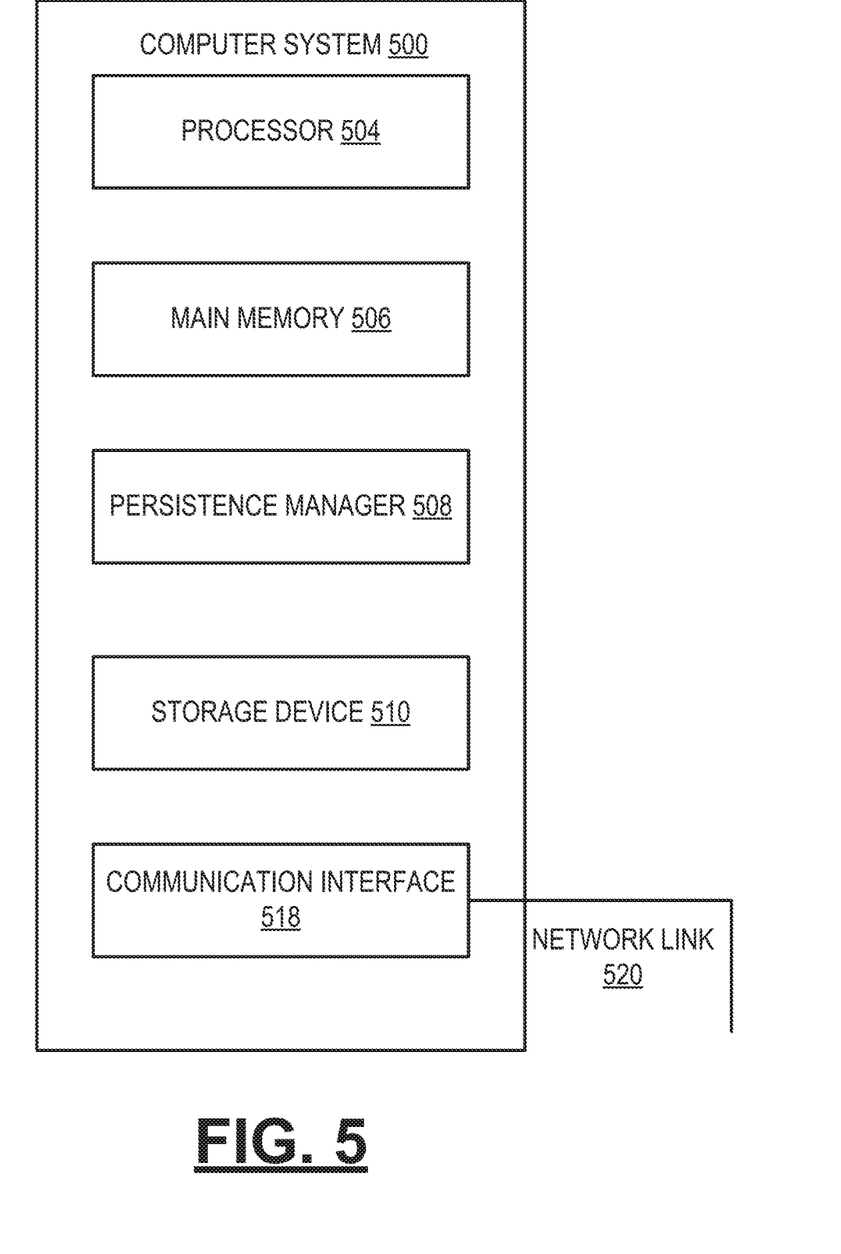
FIG. 5 is a block diagram that illustrates a computer system upon which aspects described herein may be implemented.

FIG. 5 is a block diagram that illustrates a computer system upon which aspects described herein may be implemented. For example, in the context of FIG. 1, persistence management system 100 may be implemented using one or more servers such as described by FIG. 5.

In an aspect, computer system 500 includes processor 504, memory 506 (including non-transitory memory), persistence manager 508, storage device 510, and communication interface 518. Computer system 500 includes at least one processor 504 for processing information. Computer system 500 also includes the main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 may also include a read only memory (ROM) or other static storage device for storing static information and instructions for processor 504. The storage device 510, such as a magnetic disk or optical disk, is provided for storing information and instructions. The communication interface 518 may enable the computer system 500 to communicate with one or more networks through use of the network link 520 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., WiFi and WiMax networks).

Examples described herein are related to the use of computer system 500 for implementing the techniques described herein. According to one aspect, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative aspects, hard-wired circuitry may be used in place of or in combination with software instructions to implement aspects described herein. Thus, aspects described are not limited to any specific combination of hardware circuitry and software.

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an aspect, can be combined with other individually described features, or parts of other aspects. Thus, absence of describing combinations should not preclude the inventor(s) from claiming rights to such combinations.

What is claimed is:

1. A method comprising:
    intercepting a write request by a first process executed in a user space of a server that executes a local file system within an operating system kernel of the server, the server communicating with a remote storage system executing a remote file system;
    routing the write request to a second process executed in the user space that uses a data structure to manage a server cache from the user space, the server cache configured to use configurable size extents for storing information for the local file system, and the data structure is periodically flushed by the second process to a persistent memory directly mapped to the local file system;
    allocating by the second process, a first extent from a queue that tracks free extents for the server cache upon determining by the second process that the data structure is without an entry for an extent from a number of extents corresponding to the write request;
    wherein the second process maintains the queue and the number of extents are based on a size of the write request and an extent size used by the local file system;
    using the first extent to write a portion of data for the write request by the second process that transmits an array to the persistent memory indicating to the local file system a server cache miss for the portion of data, when the size of the write request is aligned with the extent size; and
    updating the data structure by the second process indicating that the first extent stores the portion of data; wherein the data portion is replicated by the local file system from the server cache to the remote storage system based on the updating.

2. The method of claim 1, wherein the extent size of the server cache is configurable based on a size of workloads processed by the server.

3. The method of claim 1, wherein the extent size of the server cache is changeable only after information stored at the server cache is replicated to the remote storage system by the local file system.

4. The method of claim 1, wherein extents corresponding to the write request are locked by the second process, when an entry exists at the data structure and the data structure is updated for replicating data for the write request to the remote storage system.

5. The method of claim 1, wherein for a server cache hit and the write request being unaligned to the extent size, the second process reads a sub-block of an extent to copy the data portion to a buffer for the local file system.

6. The method of claim 1, wherein the array provides indicators for a cache hit and a cache miss for the number of extents corresponding to the write request.

7. The method of claim 1, wherein the first process is executed by a POSIX application programming interface (API) in the user space of the server.

8. A non-transitory, machine-readable storage medium having stored thereon instructions for performing a method, comprising machine executable code which when executed by at least one machine, causes the machine to:
    intercept a write request by a first process executed in a user space of a server that executes a local file system within an operating system kernel of the server, the server communicating with a remote storage system executing a remote file system;
    route the write request to a second process executed in the user space that uses a data structure to manage a server cache from the user space, the server cache configured to use configurable size extents for storing information for the local file system, and the data structure is periodically flushed by the second process to a persistent memory directly mapped to the local file system;
    allocate by the second process, a first extent from a queue that tracks free extents for the server cache upon determining by the second process that the data structure is without an entry for an extent from a number of extents corresponding to the write request;
    wherein the second process maintains the queue and the number of extents are based on a size of the write request and an extent size used by the local file system;
    use the first extent to write a portion of data for the write request by the second process that transmits an array to the persistent memory indicating to the local file system a server cache miss for the portion of data, when the size of the write request is aligned with the extent size; and
    update the data structure by the second process indicating that the first extent stores the portion of data; wherein the data portion is replicated by the local file system from the server cache to the remote storage system based on the updating.

9. The non-transitory, machine-readable storage medium of claim 8, wherein the extent size of the server cache is configurable based on a size of workloads processed by the server.

10. The non-transitory, machine-readable storage medium of claim 8, wherein the extent size of the server cache is changeable only after information stored at the server cache is replicated to the remote storage system by the local file system.

11. The non-transitory, machine-readable storage medium of claim 8, wherein extents corresponding to the write request are locked by the second process, when an entry exists at the data structure and the data structure is updated for replicating data for the write request to the remote storage system.

12. The non-transitory, machine-readable storage medium of claim 8, wherein for a server cache hit and the write request being unaligned to the extent size, the second process reads a sub-block of an extent to copy the data portion to a buffer for the local file system.

13. The non-transitory, machine-readable storage medium of claim 8, wherein the array provides indicators for a cache hit and a cache miss for the number of extents corresponding to the write request.

14. The non-transitory, machine-readable storage medium of claim 8, wherein the first process is executed by a POSIX application programming interface (API) in the user space of the server.

15. A system, comprising:
a memory containing machine readable medium comprising machine executable code having stored thereon instructions; and a processor coupled to the memory, configured to execute the machine executable code to:
intercept a write request by a first process executed in a user space of a server that executes a local file system within an operating system kernel of the server, the server communicating with a remote storage system executing a remote file system;
route the write request to a second process executed in the user space that uses a data structure to manage a server cache from the user space, the server cache configured to use configurable size extents for storing information for the local file system, and the data structure is periodically flushed by the second process to a persistent memory directly mapped to the local file system;
allocate by the second process, a first extent from a queue that tracks free extents for the server cache upon determining by the second process that the data structure is without an entry for an extent from a number of extents corresponding to the write request;
wherein the second process maintains the queue and the number of extents are based on a size of the write request and an extent size used by the local file system;
use the first extent to write a portion of data for the write request by the second process that transmits an array to the persistent memory indicating to the local file system a server cache miss for the portion of data, when the size of the write request is aligned with the extent size; and
update the data structure by the second process indicating that the first extent stores the portion of data; wherein the data portion is replicated by the local file system from the server cache to the remote storage system based on the updating.

16. The system of claim 15, wherein the extent size of the server cache is configurable based on a size of workloads processed by the server.

17. The system of claim 15, wherein the extent size of the server cache is changeable only after information stored at the server cache is replicated to the remote storage system by the local file system.

18. The system of claim 15, wherein extents corresponding to the write request are locked by the second process, when an entry exists at the data structure and the data structure is updated for replicating data for the write request to the remote storage system.

19. The system of claim 15, wherein the array provides indicators for a cache hit and a cache miss for the number of extents corresponding to the write request.

20. The system of claim 15, wherein the first process is executed by a POSIX application programming interface (API) in the user space of the server.

* * * * *